United States Patent [19]
d'Alayer de Costemore d'Arc

[11] Patent Number: 5,828,537
[45] Date of Patent: Oct. 27, 1998

[54] DEVICES FOR ACCESSING INFORMATION IN THE MEMORY CIRCUITS OF MAGNETIC TAPE CASSETTES

[75] Inventor: Stephane M. A. d'Alayer de Costemore d'Arc, Genappe, Belgium

[73] Assignee: Staar S.A., Brussels, Belgium

[21] Appl. No.: 702,310

[22] Filed: Aug. 23, 1996

[30] Foreign Application Priority Data

Sep. 1, 1995 [BE] Belgium ................................ 09500729

[51] Int. Cl.$^6$ ............................ G11B 15/07; G11B 23/32
[52] U.S. Cl. ........................................... 360/137; 360/96.5
[58] Field of Search .............................. 360/69, 71, 96.5, 360/85, 132, 137

[56] References Cited

U.S. PATENT DOCUMENTS

| | | | |
|---|---|---|---|
| 4,338,644 | 7/1982 | Staar | ........................................ 360/132 |
| 4,426,684 | 1/1984 | Sechet et al. . | |
| 5,291,346 | 3/1994 | Baekgaard . | |

FOREIGN PATENT DOCUMENTS

| | | |
|---|---|---|
| 0583904 | 2/1994 | European Pat. Off. . |
| 0599718 | 6/1994 | European Pat. Off. . |
| 0603808 | 6/1994 | European Pat. Off. . |
| 0622794 | 11/1994 | European Pat. Off. . |
| 0628965 | 12/1994 | European Pat. Off. . |
| 2694829 | 5/1992 | France . |
| 3435506 | 4/1986 | Germany . |
| 4232868 | 3/1994 | Germany . |
| 8910615 | 11/1989 | WIPO . |
| 9308571 | 4/1993 | WIPO . |
| 9316475 | 8/1993 | WIPO . |

OTHER PUBLICATIONS

Patent Abstracts of Japan, JP 62 073479 Yoshiyuki, "Magnetic Tape Containing Case and Magnetic Recording and Reproducing Device on Which Case is Loaded," 4 Apr. 1997.

*Primary Examiner*—Aristotelis M. Psitos
*Assistant Examiner*—James L. Habermehl
*Attorney, Agent, or Firm*—Leydig, Voit & Mayer

[57] ABSTRACT

A read device for cassettes with electronic memory allows a cassette to be inserted in the read device without requiring the cassette to be loaded in an operative position in a recording/playback unit. Fragile contacts of the read device are protected from damage by an orientation and locking pin cooperating with a centering hole in the cassette shell so the contacts engage the memory terminals of a cassette only when the cassette is properly positioned. The contacts are engaged only when the cassette is locked in position. The terminals and contacts are relatively movable solely in their common planes. If the cassette is presented to the read device upside down or wrong side first, or lacks a centering hole in the required location, entry is blocked, the contacts are not exposed and engagement of the terminals by the cassette is prevented. In embodiments where the read device includes a movable housing member defining a recess into which a cassette is inserted, when the cassette is oriented by the pin and held as the housing member is moved, the terminals of the cassette memory directly face the contacts of the read device, and the terminals and contacts are relatively movable solely in their common planes, preventing damage to the contacts.

24 Claims, 3 Drawing Sheets

DEVICES FOR ACCESSING INFORMATION IN THE MEMORY CIRCUITS OF MAGNETIC TAPE CASSETTES

FIELD OF THE INVENTION

The present invention relates to apparatus usable with magnetic tape cassettes provided with electronic memory (memory-in-cassette) inside the shells of the cassettes and memory terminals outside the shells, the memory storing information relative to the cassettes, the tapes and/or recordings on the tapes.

BACKGROUND OF THE INVENTION

More particularly, this invention relates to improvements in read devices for accessing the electronic memory in magnetic tape cassettes via the memory terminals to read information in the memory, such cassettes and prior systems and devices for accessing the memory being described in detail in commonly assigned U.S. Pat. Nos. 4,338,644 and 4,383,285.

To access cassette memory in the manner described in the aforesaid U.S. patents, recording/playback apparatus are provided with read/write devices integrated with the control electronics of the apparatus. The read/write devices have fixed contacts inside the apparatus which establish a connection with terminals of a memory, once a cassette has been loaded in its operative position in a recording/playback apparatus. This manner of accessing the memory insures, among other considerations, that the read/write process is not disturbed by extraneous information or external commands and the management and organization of the information on the magnetic tape takes place simultaneously with the read/write functions performed by the control electronics of the apparatus.

In practice, however, notwithstanding the advantages of having an integrated read/write device operable when a cassette is loaded in an apparatus, a user often desires to access the memory without having to load the cassette in a recording/playback apparatus, for example, to obtain information relative to the tape or data recorded on the tape. This may be to check or simply to become informed as to the content of the memories of the various cassettes that a user owns or just to become informed of the remaining recording capacity of various cassettes without having to load the cassettes in a playback/recording apparatus, wait for the read-out of the memory information, and unload the cassettes. Furthermore, with a recording/playback apparatus having such an integrated read/write device, the memory of one cassette cannot be accessed as long as another cassette is loaded in the apparatus. Moreover, loading and unloading cassettes in such apparatus solely to obtain access to memory increases operation cycles of the loading/unloading mechanism and thus increased wear of the mechanism.

To access memory-in-cassette memory, it has been proposed to provide a storage unit for cassettes, separate from a playback/recording apparatus, which has memory access devices in the storage compartments and complete control electronics including a power supply, microprocessor and interface circuits, making it rather costly to manufacture.

SUMMARY OF THE INVENTION

The principal object of the present invention is to overcome the above-mentioned drawbacks of prior apparatus by providing a simple, low cost and easy to operate improved read device allowing a user to access the memory of a particular cassette without having to load it in operative position in a playback/recording apparatus.

Another important object is to provide such an improved read device which can be mounted to, and electrically connected with and utilize the control electronics of, a playback/recording apparatus, thereby significantly reducing complexity and cost of adding an independent memory-access function to the playback/recording apparatus.

Another object of the present invention is to provide such an improved read device with safeguards to prevent damage to fragile read contacts utilized to establish connection with the terminals of the memory of a cassette.

Further objects will become apparent from the following description of different embodiments of the invention, taken in conjunction with the accompanying drawings, in which:

DETAILED DESCRIPTION

Figure 8:
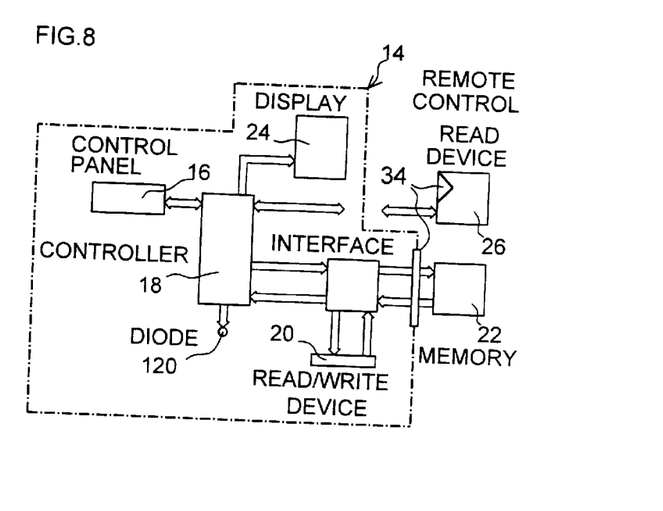
FIG. 8 is a schematic diagram of the interconnections between the electronic components of a playback/recording apparatus with read/write device and read device according to the invention.

Turning first to FIG. 8, schematically diagramed is a playback/recording apparatus 14 (shown in FIG. 1) having a control panel 16 for a controller 18 with a microprocessor, connected through interface circuits to a read/write device 20 inside the apparatus 14 which has contacts engaged by terminals 21 (FIG. 3) of a cassette electronic memory 22 when a cassette is located in operative position within the apparatus. Preferably the apparatus includes a slot-type loading/unloading mechanism such as that disclosed in commonly assigned U.S. Pat. No. 4,546,396 although other loading/unloading mechanisms may be used as desired. A display 24 and a remote control unit 26 including a microprocessor and data transmission circuits are also illustrated.

Figure 3:
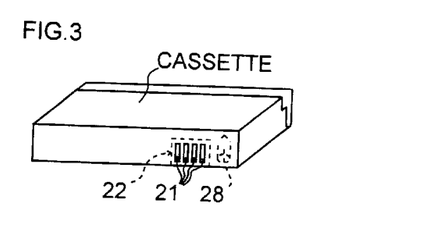
FIG. 3 is a schematic view of a cassette with memory inside a cassette shell and terminals outside a back wall of the cassette shell.

A type of cassette, herein shown as a DVC, incorporating electronic memory 22 and outside terminals 21 as described in detail in U.S. Pat. Nos. 4,338,644 and 4,383,285, is schematically shown in FIG. 3; in this type cassette the bottom wall of the shell is convention ally provided with centering holes generally adjacent the back corners, one of such centering holes 28 being shown in FIG. 3 in proximity to the outside terminals 21 of the memory 22. The present invention contemplates apparatus and devices for reading electronic memory provided in other types of cassettes as well, such as DCC or 8 mm cassettes which have magnetic tape utilized primarily for back-up of computer data, and for reading electronic memory of other types of information supports such as discs which may be carried in cassettes or containers variously referred to as cartridges or containers, the term cassettes being used generically to refer to cassettes, cartridges or containers.

Figure 1:
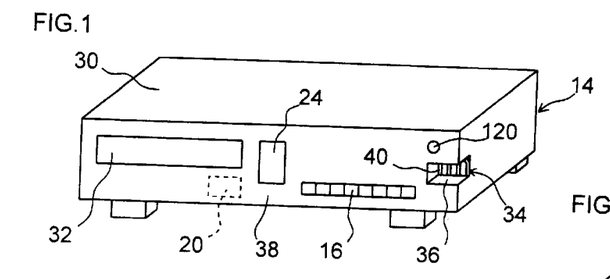
FIG. 1 schematically shows a recording/playback apparatus incorporating a read device according to the invention in the outer wall of the housing of the apparatus.

Now turning to FIGS. 1 and 3, recording/playback apparatus 14 is shown having a housing 30, an opening 32 through which a cassette such as shown in FIG. 3 may be introduced into the apparatus 14 and a loading/unloading mechanism as above mentioned to carry the cassette between a loading position and an operative position within the housing 30. The playback/recording apparatus 14 includes components operated by a controller 18 having a control panel 16 and microprocessor to function with a cassette when in the operative position to perform playback and recording operations. Additionally, inside the housing 30 the apparatus includes a read/write device 20 interfaced through interface circuits to the controller 18 and having contacts engaged by memory terminals 21 of a cassette when it is in the operative position which connect the memory 22 to the controller 18 for processing of data. Such an apparatus is disclosed in detail in the aforesaid U.S. Patents.

Figure 7A:
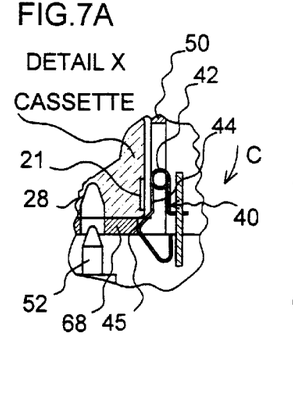
FIGS. 7A and 7B are enlarged fragmentary detail views taken as indicated by the locations X and Z in FIGS. 6B and 6A, respectively.
Figure 7B:
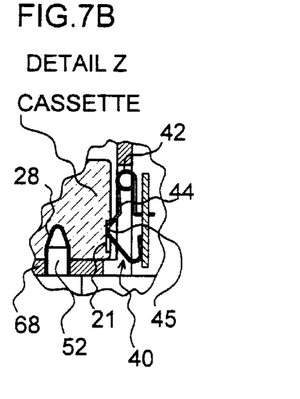

According to the present invention, a read device 34 for cassette memory is also provided in the embodiment of FIG. 1 which is mounted recessed in an opening 36 in the front panel 38 of the housing 30 for access from outside the housing of the playback/recording apparatus 14 without utilizing the loading/unloading mechanism. The read device 34 has contacts 40 which have an operable electrical connection to the controller 18; the read-device contacts 40 are engageable by outside terminals 21 of a cassette memory 22 when the cassette is presented to the read device 34 oriented and properly positioned to make electrical connection with the contacts 40 of the read device. Provision of the read device 34 recessed in an opening 36 to prevent damage to the read-device contacts 40 is important since the cassette is normally held and presented manually to the contacts 40 of the read device 34. The surface of each terminal 21 outside the back wall of the cassette shell is located in a recess in the back wall for protection against scratches and unwanted electric connections while the contacts 40 of the read device 34 must protrude from their support so as to insure positive engagement and good electrical contact. Such protrusion is a large source of potential mechanical damage to the contacts 40 should the cassette not be presented very carefully such that the terminals 21 directly face the read-device contacts 40 and, for example, translated laterally, which can result in bending the contacts 40 which can be easily bent thus requiring the servicing of the unit, which is very undesirable. The contacts 40 are very fragile, typically thin, gold plated wire contacts, each shaped into a hair pin portion 42, a longitudinal leg 44, and two bent portions forming a triangle the apex 45 of which is engaged by a terminal strip of the terminals 21 of the cassette memory 22 when the contacts 40 are exposed and properly engaged (as shown in FIG. 7B).

In the embodiment of the apparatus shown in FIG. 1, the contacts 40 of the read device 34 are recessed in an opening 36 at a front corner of an outer wall 38 of the apparatus housing 30 with the contacts 40 fixed so as to face outside the housing 30 allowing a cassette to be manually presented to the read device 34 from outside the housing 30.

According to a preferred and best mode embodiment of the invention shown in FIGS. 2A, 2B, 4A–7B, the contacts 40 of the read device 34 are shielded against engagement by the memory terminals 21 of an inserted cassette unless the cassette is properly presented with the memory terminals 21 directly facing the contacts 40 and such that the terminals 21 and contacts 40 are movable relatively solely in common planes. For this purpose, the read device 34 has an outer casing 46 (FIG. 4A) which is either mounted in an opening in the playback/recording-apparatus housing 30 or is part of the housing, and the outer casing 46 supports a movable read-device housing 48 (FIG. 6A) which forms a wedge shaped recess in the front wall of the apparatus housing 30 with the contacts 40 protruding through a lateral wall 50 of the movable housing 48 into the recess. As in the embodiment of FIG. 1, the contacts 40 of the read device 34 have an operable electrical connection to a controller 18 and should these contacts 40 be engaged by memory terminals 21 of a cassette memory 22 when a cassette is properly positioned in the read device 34, the read device 34 and the operable electrical connection enable the controller 18 to read signals in the memory 22 of the cassette, via its contacts 40 and the cassette memory terminals 21, notwithstanding the presence or absence of a cassette in the operative position in the playback/recording apparatus 14, and to display information represented by the signals on the display 24 which may be included on the housing 30 of the apparatus or may be a separate display such as a TV screen or computer monitor.

In carrying out an important aspect of the invention, in the embodiment of the invention shown in FIGS. 2A, 2B, 4A–7B, the read device 34 is usable with cassettes having memory terminals 21 mounted outside a back wall of the cassette shell, and a centering hole 28 in proximity to the memory terminals in a bottom wall of the shell as illustrated in FIG. 3. As above noted such centering holes 28 are conventionally provided in DVC and 8 mm cassettes adjacent both back corners to cooperate with centering pins of playback/recording apparatus to accurately locate such cassettes in operative position in the apparatus; according to the present invention, a locking pin 52 which is aligned with the centering hole 28 at the back corner in proximity to the memory terminals 21 is utilized for sensing (without the centering hole in the back corner presented to the read device 34 a cassette will be blocked from fully entering the device), for insuring that the cassette is oriented in proper position in the read device 34 with the memory terminals 21 directly facing the read device contacts 40 and for locking the cassette in position so that the cassette will not damage the read-device contacts. Such a locking pin 52 riveted to the bottom (FIG. 4B) of the read device 34 is shown diagrammatically in FIGS. 2A and 2B, and enters the shell hole 28 shown in FIG. 3 (FIG. 4A) when the cassette is properly positioned.

While the locking pin 52 which senses and cooperates with a properly located centering hole 28 in a cassette serves to prevent improper engagement of the read device contacts 40 by a cassette, further in carrying out the invention, in the most preferred embodiment shown in FIGS. 2A, 2B, 4A–7B, the movable housing 48 of the read device 34 includes the wall 50 which functions as a shield, the wall 50 and a cassette locked in position in the read device 34 being relatively movable from a shielded position (see FIG. 7A), in which the contacts 40 are shielded from engagement by the cassette, to a position (see FIG. 7B) with the memory terminals 21 directly facing and in common planes with the contacts 40. The supports for the terminals 21 and the contacts 40 allow relative movement between the terminals and contacts only in the common planes, and relative transverse movement is prevented, to guard against mechanical damage to the contacts.

Figure 4A:
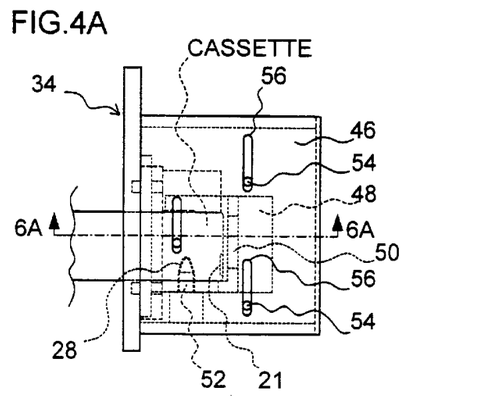
FIGS. 4A, 4B and 5 are side views of the read device of FIG. 2A shown separate from the playback/recording apparatus.
Figure 4B:
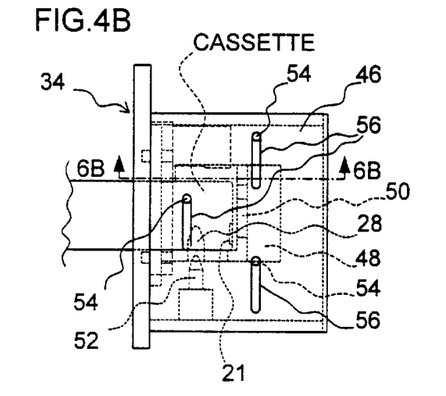
Figure 5:
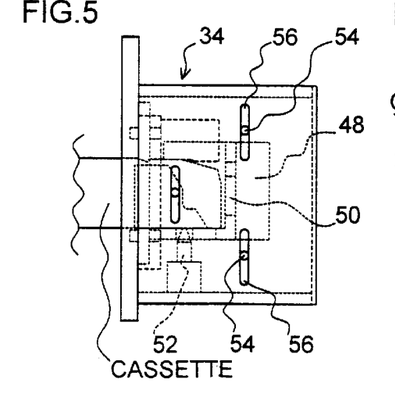
Figure 6A:
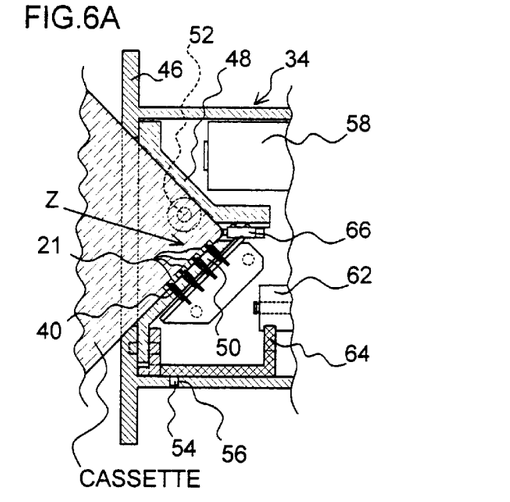
FIGS. 6A and 6B are sectional views of the read device taken respectively in the planes of lines 6A—6A and 6B—6B in FIGS. 4A and 4B.
Figure 6B:
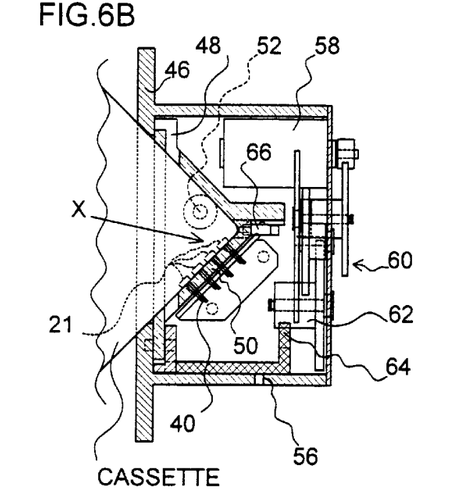

To this end, referring to FIGS. 4A, 4B, 5, 6A, 6B, the movable housing 48 of the read device 34 is movable upwards and downwards within the outer casing 46 being supported by pins 54 attached to the read device housing 48 and guided by grooves 56 provided in the lateral walls of the casing 46 which in this example is box-shaped. The up and down movements of the housing 48 are powered by a micromotor 58 whose output shaft drives a set of gears 60, the final gear 62 engaging a rack 64 provided on an edge of the read device housing 48. The micromotor 58 is preferably controlled by a switch 66 located where the lateral walls of the movable housing 48 join to form the wedge-shaped recess and projects into the recess to be engaged by the back corner of a cassette when inserted into the recess. When a cassette is properly presented and the switch 66 is actuated by the corner of the cassette, the micromotor 58 is powered from a source and the housing 48 is lowered (FIGS. 4A, 6A, 7B) and the locking pin 52 enters the shell hole 28 in the cassette in proximity to the memory terminals 21, thus allowing its full downwards movement and at the same time locking the cassette in its operative position. Simultaneously, the contacts 40 of the read device 34 come into engagement with and are pressed against the terminals 21 of the cassette memory 22. To shield the contacts 40 from engagement by a cassette if improperly presented, as shown in FIG. 7A when the housing 48 is in its upper position the contacts 40, in particular, the portions bent into a triangular shape to form the apex 45, are behind and/or below the housing 48 and the apex 45 is engaged with the bottom wall member 68 of the housing 48, so that whatever movement is imparted to the cassette, the contacts 40 cannot be touched. When the housing 48 is lowered as shown in FIGS. 4A, 6A and 7B, the contacts 40 are caused to rotate clockwise by the hair-pin portion 42 and project through vertical slots in the read-device-housing lateral wall 50 in front of each contact 40 which allow them to protrude through the housing 48 into engagement with the memory terminals 21. Because the cassette is locked in position by the cooperation of the locking pin 52 and the shell-wall hole 28, the memory terminals 21 and contacts 40 are supported to prevent relative transverse movement while movable in their common planes into good electrical engagement.

If a cassette is not properly presented, for example, upside down or front first, then the shell-wall hole 28 is never aligned with the locking pin 52 (see FIG. 5) and the movable housing 48 cannot be lowered. Accordingly, the contacts 40 remain shielded by the housing wall members 50, 68 and no damage can occur to them even if the user shifts the cassette roughly in the housing 48 trying to force engagement or removes the cassette from the housing. Now turning to FIGS. 9–12, another embodiment of the invention is shown suited particularly to an 8 mm magnetic tape cassettes having, like the cassette shown in FIG. 3, an electronic memory 22, memory terminals 21 on a back wall of the cassette shell next to one corner, and a centering hole 28 in the shell bottom wall in proximity to the memory terminals 21. In this embodiment, a read device 34 to read contents of an electronic memory 22 in such an 8 mm cassette is mounted behind the front plate 38 of a unit 14 adapted to be mounted in a computer tower or similar computer apparatus in a slot having a standard width and height. The front plate 38 provides an opening 32 through which a cassette may be introduced to loading/unloading mechanism behind the front plate 38 to receive and transfer a cassette between a loading position outside the apparatus and an operative position within the apparatus. In this embodiment, to conserve space, the read device 34 of the invention is housed behind the front plate 38 on one side of the loading/unloading mechanism opening 32 and is positioned vertically so as to fit within the standard width of the slot in the computer tower. The read device 34 has an outer casing 70 which supports a movable U-shaped frame 72 having lateral walls and supporting a housing 73 which forms a vertical wedge-shaped recess one wall of which serves as a support 74 for read contacts (not shown). The housing 73 receives a cassette for purpose of reading contents of its electronic memory. To protect the read device 34, it has a front door 75 pivotable around a horizontal axis 76 and comprising a geared sector 78 the periphery of which meshes with gear teeth 80 mounted on a lateral edge of the U-shaped frame 72 which can be translated horizontally with respect to the casing 70 as a result of the support provided by studs 82 mounted on the sides of the frame 72 and grooves 84 provided in the lateral sides of the casing 70.

Figure 10A:
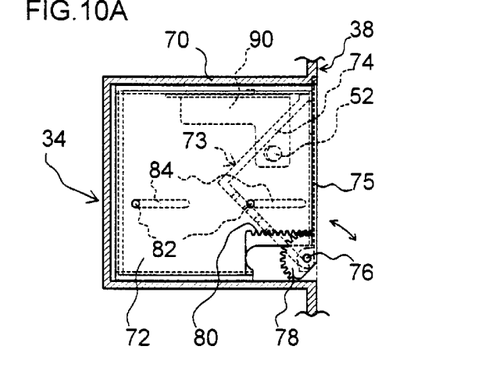
FIGS. 10A and 10B are sectional views taken substantially in the plane of lines 10—10 in FIG. 9 and show the read device retracted and shielded in FIG. 10A and extended and open to receive a cassette in FIG. 10B.
Figure 10B:
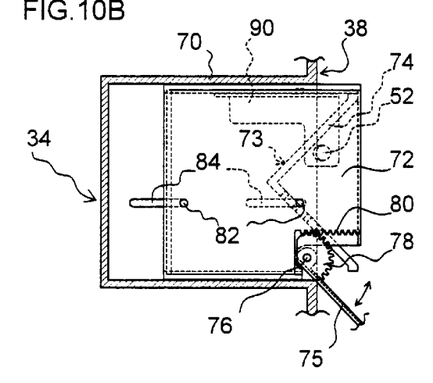

As shown in FIGS. 10A and 10B, a pivotal movement imparted by the user to the door 75 upon opening it for gaining access to the read device 34, translates the frame 72 and housing 73 which then slightly projects from the front plate 38. Pivoting the door 75 upwards closes the door and returns the frame 72 and housing 73 behind the front plate 38. As shown in these Figs., an inclined housing wall and the contact support 74 join to form the vertical wedge-shaped recess and the housing 73 also includes side walls (FIGS. 11A, 11B) which are spaced to provide an entrance 88 which matches the height or thickness of a cassette. The read contacts on the support 74 face the outside of the apparatus housing and are not shown in detail but are preferably the same type as the contacts 40 shown in detail in FIGS. 7A and 7B.

Figure 11A:
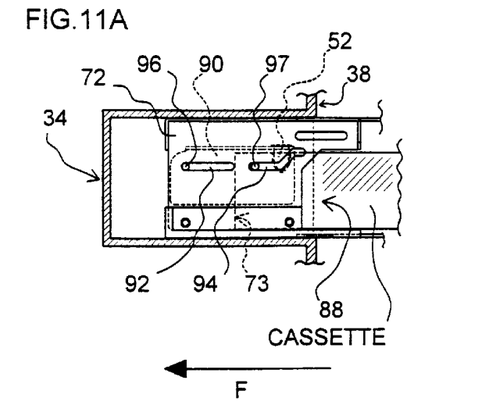
FIGS. 11A and 11B are sectional views taken substantially in the plane of lines 11—11 in FIG. 9 and correspond to FIG. 10A.
Figure 11B:
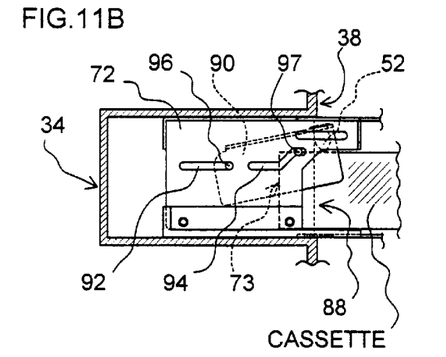
Figure 12:
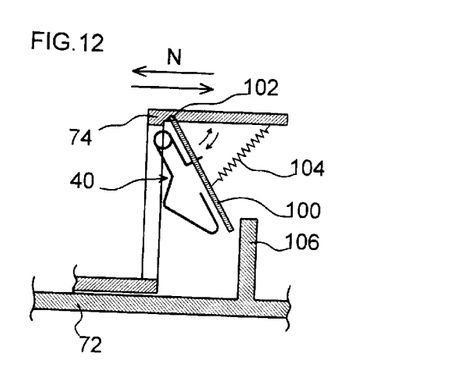
FIG. 12 illustrates the embodiment of FIG. 9 with a pivotable panel that supports the read device contacts.

For sensing a properly inserted cassette and locking the cassette in position, a locking pin 52 is riveted on a movable support 90 which can be translated with respect to the housing 73 by virtue of grooves 92, 94 provided in the U-shaped frame 72 and pins 96, 97 fixed to the movable support 90. As viewed in FIG. 1B, the left hand groove 92 is straight while the right-hand groove 94 is curved and has a central tilted portion which causes the forward or right-hand portion (as viewed in FIGS. 11A and 11B) of the movable support 90 to move laterally as the door 75 is opened to cause the locking pin 52 to be located laterally of and clear of a cassette as it is inserted into the read device 34, as shown in FIG. 11B. The movable frame 72 is locked against translation, after the door 75 has been opened, by a conventional ratchet assembly, not shown and, accordingly, insertion of a cassette powers a backward translation (indicated by the arrow F in FIG. 11A) of the movable support 90 (from the position of FIG. 11B to the position of FIG. 11A) as the front edge of the cassette enters the frame 72 and housing 73. Movement of the cassette towards the back of the housing 73 powers translation of the movable support 90 and thus of the pins 96, 97 which follow the straight groove 92 and the curved groove 94, the profile of which drives the pin 97 in that groove 94 toward the cassette. As explained in the previously described embodiments, should a cassette be improperly presented or inserted, then the locking pin 52 abuts the cassette shell and the inward movement is immediately blocked as the width of the opening 88 corresponds to the height of the cassette. In a preferred embodiment, the read contacts 40, as shown in FIG. 12, are mounted on a panel 100 that pivots around a shaft 102 mounted on the support 74 and undergoing the action of a spring 104. In this particular embodiment, the support 74 can be slightly translated, as indicated by arrows N, with reference to the frame 72. In the absence of a properly inserted cassette, the contacts 40 are in the position shown in FIG. 12, and thus shielded against damage unless a properly oriented and presented cassette enters the read device 34 and engages and moves the movable support 90 for the locking pin 52. When a cassette is properly positioned, the cassette shell wall hole 28 is aligned with the locking pin and the pin enters the hole to lock the cassette immobile relative to the read device contacts 40, simultaneously the support 74 is translated and, thus, the contact panel 100 engages an abutment 106 provided on the frame 72 which forces it to pivot clockwise and thus to apply the contacts 40 against the contacts 21 of the memory, thereby assuring good electrical connection between the contacts 40 and the memory terminals 21. When a cassette is to be withdrawn from the read device 34 after a read operation, the cassette is moved outward and the locking pin support 90 is caused to pivot laterally and retract the pin 52 from the cassette hole 28, allowing the cassette to be removed from the read device 34. The door 75 may then be pivoted upwards to close the entry to the read-device recess.

Figure 2A:
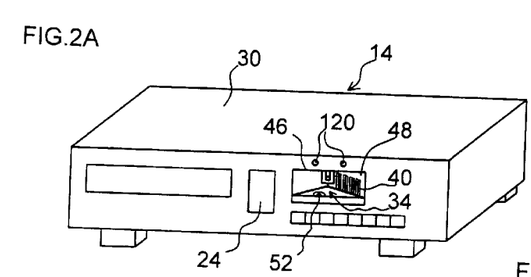
FIG. 2A schematically shows a recording/playback apparatus similar to FIG. 1 with another embodiment of read device according to the invention.
Figure 2B:
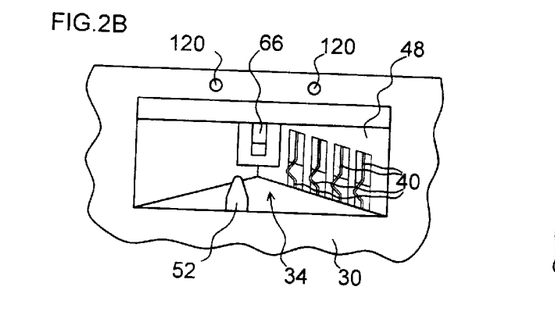
FIG. 2B is an enlarged fragmentary view of the read device shown in FIG. 2A.
Figure 9:
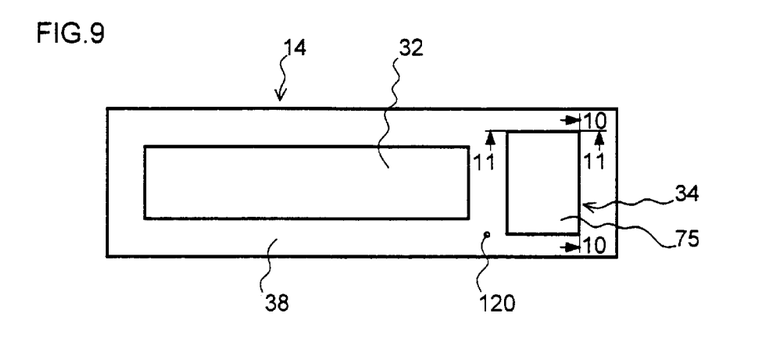
FIG. 9 schematically shows an apparatus with another embodiment of read device according to the invention, usable specifically with an 8 mm cassette with memory, intended for data storage.
Figure 13:
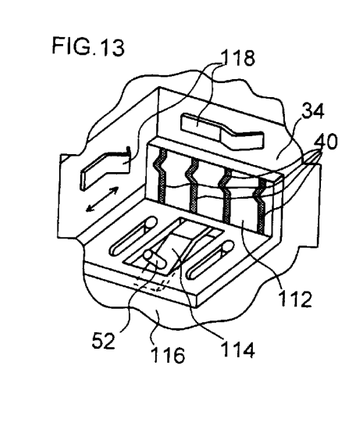
FIG. 13 illustrates another embodiment utilizing a movable panel which supports the read device contacts for electrical engagement with memory terminals of a cassette and a locking pin for locking the cassette in proper position.

Another embodiment of the invention is illustrated in FIG. 13. According to the invention, as in the prior embodiments the read device 34 is mounted in an opening in an outer wall of a playback/recording apparatus housing, and includes members defining a wedge-shaped recess allowing a cassette to be manually presented to the read device 34 from outside the housing along an entry plane which, in this instance, is a horizontal plane. In the embodiment of FIG. 9 the entry plane is a vertical plane. As carried out in this embodiment, one wall of the recess is provided by a movable contact panel 112 which is located perpendicular to the entry plane and the read device contacts 40 are mounted on the contact panel 112, the contact panel being movable backward from an initial position and returnable forward to the initial position upon being pushed by a cassette entering the recess along the entry plane. To prevent damage to the contacts 40 until proper positioning of the cassette and memory terminals 21 is assured, the movable contact panel 112 is interconnected with a pivotable plate 114 which supports a locking pin 52 adjacent the entry plane of a cassette, the plate 114 being pivotable upward and downward as viewed in FIG. 13 as the contact panel 112 moves backward and forward to move the locking pin 52 through the bottom wall 116 of the recess. Should the read device 34 be mounted vertically as in the embodiment of FIG. 9, the movement of the pivotable plate 114 would be laterally inward and outward as the contact panel 112 moves backward and forward. When a cassette is properly positioned as indicated by the presence of a centering hole 28 in the bottom wall of the cassette shell adjacent the back corner which carries the memory terminals 21, as the contact panel 112 is moved backward by the cassette it causes the locking pin plate 114 to pivot upward (or inward) so that the locking pin 52 enters the cassette hole 28 which is aligned with the pin. The locking pin 52 holds the cassette and contact panel 112 against relative movement with the contacts 40 and memory terminals 21 in electrical engagement. Switches 118 are placed to be actuated by a cassette when fully seated in the read device recess to actuate the read device circuits. Similarly placed switches may be used in the embodiment of FIG. 1 to actuate a visual indicator such as one or more diodes 120 (FIGS. 1, 2A, 2B, 8, 9) to remind the user of the necessity to keep the cassette memory terminals 21 pushed against the read device contacts 40 to insure a good electrical connection for read operation. Furthermore, a read device 34 having the mechanisms as shown in FIGS. 2A, 9, or 13 in accordance with the invention for locking a cassette with respect to the read-device contacts 40 during a read operation may be incorporated in a remote control unit 26 such as illustrated in FIG. 8 which includes a controller including a microprocessor and data transmission circuits.

What is claimed is:

1. In combination:

cassettes containing a magnetic recording tape, each of said cassettes having a shell, electronic memory supported by a shell wall inside said shell, and memory terminals connected to said memory supported by a shell wall outside of said shell;

a playback/recording apparatus for said cassettes having a housing and a loading/unloading mechanism to receive and load one of said cassettes in an operative position inside said playback/recording apparatus housing, a controller including a microprocessor for operating said playback/recording apparatus to function with one cassette when in the operative position, and a read/write device inside said playback/recording apparatus housing interfaced to the controller and having contacts engaged by terminals of one cassette when in the operative position which connect the memory of said one cassette to the controller of the playback/recording apparatus for processing of data;

a display associated with said playback/recording apparatus and electrically connected with the controller; and a read device mounted for access from outside said playback/recording apparatus housing without utilizing said loading/unloading mechanism including contacts which have an operable electrical connection to the controller and which are engageable by terminals of an other of said cassettes when said other cassette is presented to said read device, the operable electrical connection enabling the controller to read signals in the memory of said other cassette when presented to said read device and to display information on the display represented by the signals notwithstanding the presence or absence of said one cassette in the operative position in the playback/recording apparatus housing.

2. The combination according to claim 1 wherein the read device is mounted in an outer wall of said playback/recording apparatus housing with the contacts facing outside said housing, allowing said other cassette to be manually presented to the read device from outside said housing.

3. The combination according to claim 2 wherein the contacts of the read device are recessed in an opening in the outer wall of the playback/recording apparatus housing which allows the contacts to be approached and engaged by the memory terminals of said other cassette when manually presented to the read device.

4. A playback/recording apparatus for cassettes containing a magnetic recording tape, each of said cassettes having a shell, electronic memory supported by a shell wall inside said shell, and memory terminals connected to said memory and supported by a shell wall outside of said shell;

said playback/recording apparatus including:
- a housing,
- loading/unloading mechanism to receive and load one of said cassettes in an operative position inside said housing of said playback/recording apparatus,
- a controller including a microprocessor for operating said playback/recording apparatus to function with said one cassette when in the operative position,
- a read/write device inside said housing of said playback/recording apparatus interfaced to the controller and having contacts engaged by memory terminals of said one cassette when in the operative position which connect the memory of said one cassette to the controller of the playback/recording apparatus for processing of data, and
- a read device mounted for access from outside said housing of said playback/recording apparatus without utilizing said loading/unloading mechanism including contacts which have an operable electrical connection to the controller and which are engageable by memory terminals of an other of said cassettes when said other cassette is presented to said read device, said read device and the operable electrical connection enabling the controller to read signals in the memory of said other cassette when presented to said read device, via its contacts and said other cassette memory terminals, notwithstanding the presence or absence of said one cassette in the operative position in the playback/recording apparatus, and to display information represented by the signals on a display.

5. A playback/recording apparatus according to claim 4 wherein the read device is mounted in an outer wall of said playback/recording apparatus housing with the contacts facing outside said housing, allowing said other cassette to be manually presented to the read device from outside said housing.

6. A playback/recording apparatus according to claim 5 wherein the contacts of the read device are recessed in an opening in the outer wall of the playback/recording apparatus housing which allows the contacts to be approached and engaged by the memory terminals of said other cassette when manually presented to the read device.

7. A playback/recording apparatus according to claim 6 for said cassettes, wherein a wall of the shell of each of said cassettes is provided with a hole in proximity to the memory terminals, and wherein the read device includes a locking pin located to enter the hole only when said other cassette is properly positioned with the memory terminals directly facing the contacts of the read device and in common planes and is moved onto the locking pin which enters the hole, thereby locking said other cassette in proper position while the memory is read.

8. A playback/recording apparatus according to claim 7 wherein the read device includes means for moving said other cassette onto the locking pin and a shield which exposes the contacts to be engaged only when the locking pin enters the shell wall hole, said means for moving said other cassette when the locking pin has entered the shell wall hole causing the memory terminals of said other cassette and the contacts of the read device to move relatively solely in their common planes and preventing relative transverse movement.

9. A playback/recording apparatus according to claim 8 wherein said read device includes a movable housing which holds the shell of said other cassette, shields the contacts of the read device, and moves to move the shell onto the locking pin which enters the shell wall hole, and when said other cassette is locked by the pin and held by the movable housing exposes the contacts of the read device to be engaged by the memory terminals of said other cassette only when the terminals and contacts are movable relatively solely in their common planes and restrained against relative transverse movement.

10. A playback/recording apparatus according to claim 4 wherein the read device is mounted in an opening in an outer wall of said playback/recording apparatus housing and includes members defining a recess allowing said other cassette to be manually presented to the read device from outside said housing along an entry plane, one of said recess defining members comprising a movable contact panel positioned substantially perpendicular to the entry plane which carries the read device contacts, the contact panel being movable from an initial position, and being returnable to the initial position, upon engagement by a cassette when said cassette is pushed into the recess in its entry plane properly positioned with the memory terminals directly facing the contacts, an interconnection between the movable contact panel and a pivotable plate mounted adjacent the entry plane of a cassette and pivotable laterally inward and outward as the contact panel moves backward and forward, a laterally extending locking pin carried by the plate, whereby when a cassette is properly positioned as indicated by the presence of a centering hole in the bottom wall of the cassette shell adjacent the back corner which carries the memory terminals, and the contact panel is moved by a cassette as it is pushed into the recess, it causes the locking pin plate to pivot inward so that the locking pin enters the cassette hole which is aligned with the pin, and the locking pin holds the cassette and contact panel against relative movement with the contacts and memory terminals in electrical engagement.

11. A playback/recording apparatus according to claim 10 wherein switches are placed to be actuated by a cassette when fully seated in the read device recess to actuate read device circuits.

12. A read device for cassettes containing a magnetic recording tape, each of said cassettes having a shell, electronic memory carried inside said shell, memory terminals connected to said memory mounted outside a back wall of said shell, and a hole in proximity to the memory terminals in a bottom wall of said shell, said read device including contacts which are engageable by memory terminals of a cassette when properly positioned relative to said read device with the memory terminals directly facing the contacts of the read device, a movable housing which receives the cassette when presented to said read device and shields the contacts, a locking pin mounted adjacent the movable housing and located to enter the cassette shell wall hole only when the cassette is properly positioned, a source of power connected to move the movable housing into engagement with the cassette and to move the cassette onto the locking pin which enters the shell hole when the cassette is properly positioned, locks the cassette against movement, and exposes the contacts of the read device to be engaged by the memory terminals of the cassette, and wherein the contacts are located in fixed position adjacent a wall of the movable housing which shields the contacts, and the contacts penetrate openings in the movable housing wall to become exposed for engagement by the memory terminals of the cassette when the cassette is moved onto the locking pin by the movable housing and the source of power and the pin enters the shell wall hole.

13. A read device according to claim 12 wherein movement of the cassette by the movable housing onto the locking pin locks the cassette against movement and causes relative movement of the terminals and contacts solely in their common planes and restrains them against relative transverse movement.

14. A read device for cassettes containing a magnetic recording tape, each of said cassettes having a shell, electronic memory carried inside said shell, memory terminals connected to said memory mounted outside a back wall of said shell, and a hole in proximity to the memory terminals in a bottom wall of said shell, said read device including contacts which are engageable by memory terminals of a cassette when properly positioned relative to said read device with the memory terminals directly facing the contacts of the read device, a movable housing which receives the cassette when presented to said read device and shields the contacts, a locking pin mounted adjacent the movable housing and located to enter the cassette shell wall hole only when the cassette is properly positioned, a source of power connected to move the movable housing into engagement with the cassette and to move the cassette onto the locking pin which enters the shell hole when the cassette is properly positioned, locks the cassette against movement, and exposes the contacts of the read device to be engaged by the memory terminals of the cassette, and wherein said power source is actuated responsive to operation of a switch in said movable housing, engageable by the cassette when received in said movable housing.

15. A read device according to claim 14 for said cassettes wherein the memory terminals of said cassettes are located adjacent a back corner of said cassettes, and wherein said movable housing is formed by lateral walls which join to provide a wedge-shaped recess which receives the back corner of the cassette when properly positioned.

16. A read device according to claim 15 wherein said switch is located where said lateral walls join to form the wedge-shaped recess.

17. A read apparatus for cassettes containing a magnetic recording tape, each of said cassettes having a parallelepiped shell, electronic memory carried inside said shell, and memory terminals connected to said memory carried on a back side-wall on one corner of the cassette outside of said shell, said read apparatus including:
a fixed housing having a front wall provided with an opening which allows the one corner of a cassette carrying the memory terminals to be manually inserted into the housing through the opening from outside the housing along an entry plane,
a controller including a microprocessor and data transmission circuitry which connects said controller to a display, and
a read device including contacts which have an operable electrical connection to the controller,
a wedge-shaped recess, corresponding in shape to the one corner of the cassette carrying the terminals, defined in the housing behind the opening in the front wall and having angled sides,
a member in the recess on which the contacts of the read device are mounted spaced from the front wall and located on one of the angled sides of the recess facing toward the outside of the housing so as to be engaged by the memory terminals on the one corner of a cassette manually inserted through the opening, while a portion of the shell of the cassette including all three other corners, which can be manually held for insertion and removal of the cassette, remains in front of the opening and outside the fixed housing,
said read device and the operable electrical connection enabling the controller to read signals in the memory of said cassette, via its contacts and said cassette memory terminals, and to display information on said display represented by the signals.

18. A read device for cassettes containing an information support, each of said cassettes having a shell, electronic memory carried inside said shell, memory terminals connected to said memory mounted outside a wall of said shell adjacent a corner of the shell, and a locking element in proximity to the memory terminals in a wall of said shell, said read device including contacts which are engageable by memory terminals of a cassette when properly positioned relative to said read device with the memory terminals directly facing the contacts of the read device,
a fixed housing having an outer wall provided with an opening into which the wall of a cassette which has the memory terminals may be inserted manually,
a recess defined behind the opening in the outer wall of the fixed housing,
a member in the recess on which the contacts of the read device are mounted spaced from and facing toward said outer wall allowing a cassette to be manually presented to the read device from outside the fixed housing with the wall of the cassette which has the terminals within the recess and the terminals engaged with the contacts while a portion of the shell of the cassette which can be manually held remains in front of the opening and outside the fixed housing, and
an aligning element mounted in the recess to enter the shell wall locking element only when the cassette and read device are aligned, which locks the cassette in the read device and enables the contacts of the read device to be engaged by the memory terminals of the cassette.

19. A read device according to claim 18 wherein the member and a cassette locked in position in the read device are relatively movable from a shielded position, in which the contacts are shielded from engagement by the cassette, to an engagement position with the memory terminals directly facing the contacts.

20. A read device according to claim 19 wherein the read device includes a movable housing, the member provides a wall of the movable housing having first and second portions, and movement of the movable housing shifts a cassette locked in position in the movable housing from where the first portion of the movable housing wall shields the contacts to where the second portion of the movable housing wall exposes the contacts for engagement by the memory terminals.

21. A read device according to claim 19 wherein the member is a panel which carries the contacts, the panel is pivotally mounted and relative movement between the movable housing and the pin which causes the pin to enter the shell wall hole, shifts the member from a position where the contacts are shielded to a position where the contacts are exposed for engagement by the memory terminals.

22. A read device for cassettes containing an information support, each of said cassettes having a shell, electronic memory carried inside said shell, memory terminals connected to said memory mounted outside a wall of said shell adjacent a corner of the shell, and a hole in proximity to the memory terminals in a wall of said shell, said read device including a movable panel which carries contacts which are engageable by memory terminals of a cassette, the panel and a cassette being relatively movable from a shielded position, in which the contacts are shielded from engagement by the cassette, to an engagement position with the memory terminals directly facing the contacts of the read device, a fixed housing which receives the cassette when presented to said read device, and a locking pin operatively connected to the movable panel, movement of the panel moving the locking pin into engagement with the centering hole of a cassette to lock the cassette in position in the read device, and enable the contacts of the read device to be engaged by the memory terminals of the cassette.

23. A read apparatus for cassettes containing an information support, each of said cassettes having a shell, electronic memory carried inside said shell, and memory terminals connected to said memory mounted in a shell wall outside said shell;

said read apparatus including:

a housing having a front wall provided with an opening which allows the shell wall of a cassette with the memory terminals to be manually inserted into the housing through the opening from outside the housing, a controller including a microprocessor and data transmission circuitry which connects said controller to a display, and a read device including contacts which have an operable electrical connection to said controller, a recess defined in the housing behind the opening in the front wall, a member in the recess and behind the opening on which the contacts of the read device are mounted spaced from and facing outside the housing so as to be engaged by the memory terminals on the shell wall of a cassette manually inserted through the opening, while a major portion of the shell of the cassette, which can be manually held for insertion and removal of the cassette, remains in front of the opening and outside the housing said contacts being movable between a rest position where the contacts are shielded in the absence of a cassette and an operative position where they are exposed for engagement with the terminals of the memory of said cassette to enable the controller to read signals in the memory of said cassette and display information on said display represented by the signals, said movement between said rest and operative positions being in response to the insertion of a cassette in the housing.

24. A read device according to claim 23 wherein the contacts are carried on a movable support which is biased in the rest position for shielding the contacts, the housing includes an abutment cooperating with the support of the contacts, and insertion of a cassette in the read device causes the abutment to be engaged by the contacts support to shift it to operative position for exposing the contacts to the memory terminals.

* * * * *